United States Patent [19]
Kohn et al.

[11] Patent Number: 6,030,224
[45] Date of Patent: Feb. 29, 2000

[54] HANDWRITING ANALYSIS SYSTEM

[75] Inventors: Melinda C. Kohn, Macungie, Pa.; Sally Kohn, New York, N.Y.

[73] Assignee: Hidden Creek Farm, Inc., Macungie, Pa.

[21] Appl. No.: 09/136,094

[22] Filed: Aug. 18, 1998

Related U.S. Application Data

[60] Provisional application No. 60/058,907, Sep. 2, 1997.

[51] Int. Cl.[7] .................................................. G09B 19/00
[52] U.S. Cl. ........................................................ 434/155
[58] Field of Search .................................. 434/155, 166, 434/162; 382/119, 186, 187; 273/292, 293, 296, 302, 308

[56] References Cited

U.S. PATENT DOCUMENTS

| | | | |
|---|---|---|---|
| 2,148,567 | 12/1939 | Marchant | 434/155 |
| 2,730,817 | 1/1956 | Blattner | 434/155 |
| 2,988,826 | 6/1961 | Schultz | 434/155 |
| 3,113,461 | 12/1963 | Peters | 434/155 |

*Primary Examiner*—Robert A. Hafer
*Assistant Examiner*—Kurt Fernstrom

[57] ABSTRACT

A handwriting analysis system comprises a set of "flash cards", the cards including a number of different subsets of cards. Each subset is associated with a different handwriting indicator (i.e., "size", "slant", etc.), and each card within a subset illustrates a different handwriting example associated with that indicator (i.e., for slant, the cards may be "right", "left", "no slant"). Each card includes a brief description of a personality trait associated with that handwriting sample. An analysis is performed by reviewing the entire set of flash cards and selected the card from each subset that best matches the sample, then reviewing the various personality traits described on the selected cards.

7 Claims, 4 Drawing Sheets

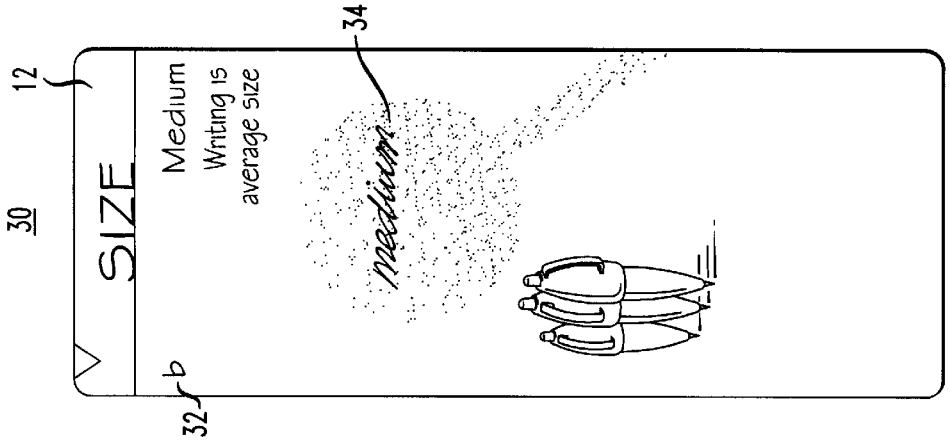
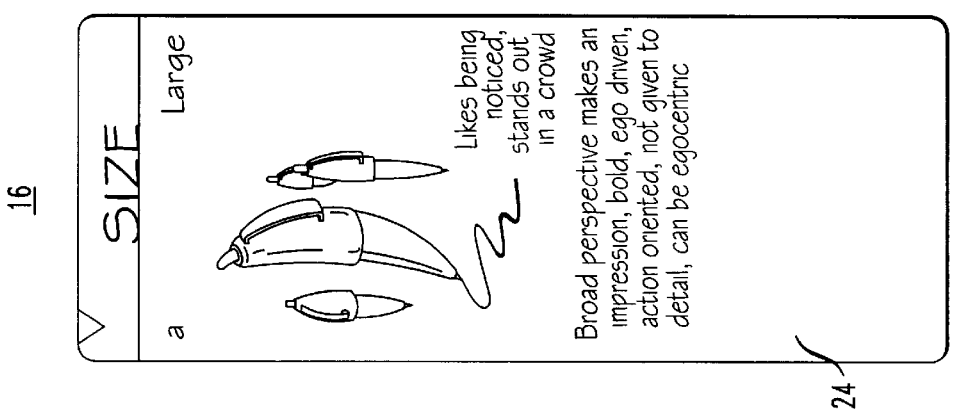
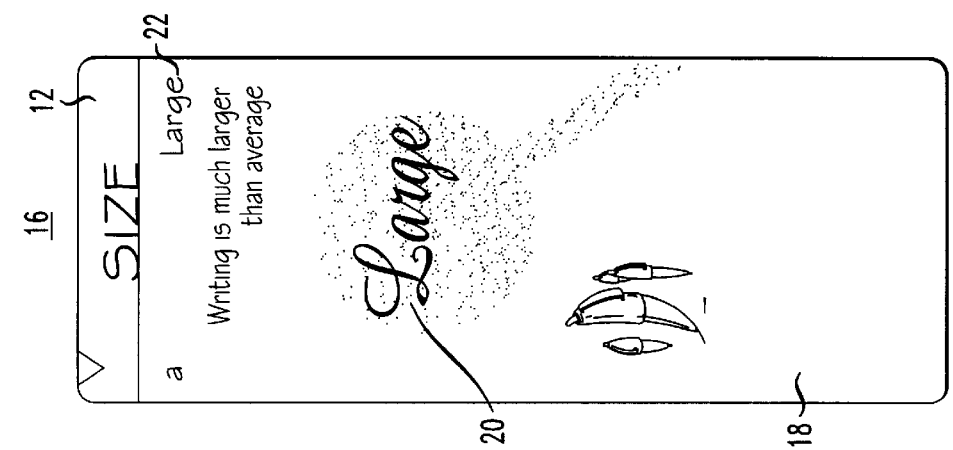
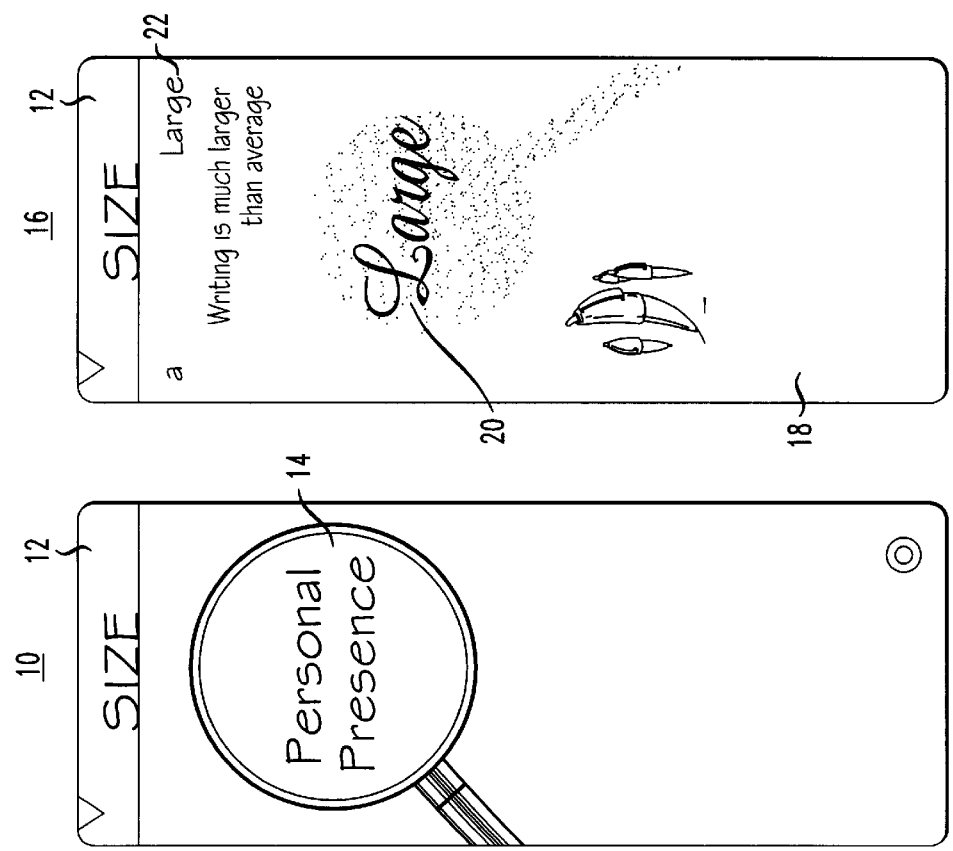

FIG. 5A 40

| HANDWRITING (PRIVATE) AND SIGNATURE (PUBLIC) | 44 | 46 FEELS | 48 | 50 | 52 | 54 |
|---|---|---|---|---|---|---|
| SIZE | 4 | LARGE | MEDIUM | SMALL | VERY SMALL | |
| SLANT | 6 | STRONG RIGHT | RIGHT | VERTICAL | LEFT | STRONG LEFT |
| CAPITALS | 4 | VERY LARGE | AVERAGE | SMALLER THAN AVERAGE | SAME SIZE AS LOWER CASE | |
| SIMPLICITY | 4 | HIGH | MEDIUM | LOW | | |
| ORIGINALITY | 3 | HIGH | MEDIUM | LOW | | |
| LETTER SHAPES | 5 | GARLAND | ARCADE | ANGLE | THREAD | |
| CONNECTEDNESS | 3 | HIGH | MEDIUM | LOW | | |
| ZONE EMPHASIS | 4 | UPPER | MIDDLE | LOWER | EQUAL | UPPER AND LOWER |
| RHYTHM | 3 | REGULAR | RIGID | VARIED | | |
| PRESSURE | 3 | HEAVY | MEDIUM | LIGHT | | |
| BASELINE | 10 | NORMALLY STRAIGHT | OVERLY STRAIGHT | RISING | FALLING | STRAIGHT BUT FAILS AT END |
|  |  | CONCAVE | ARCHED | ASCENDING STEPS UP | DESCENDING STEPS DOWN | ERRATIC |
| SPACING WITHIN WORDS | 3 | REGULAR | SPACIOUS | CROWDED | | |
| SPACING BETWEEN WORDS | 3 | REGULAR | SPACIOUS | CROWDED | | |
| SPEED | 3 | | | | | |
| LEAD IN STROKES | 3 | | | | | |
| ENDING STROKES | 4 | | | | | |
| FULLNESS | 4 | | | | | |
| LEGIBILITY | 3 | | | | | |
| HOOKS | 2 | | | | | |
| t CROSSES–HEIGHT | 4 | | | | | |
| t CROSSES–LENGTH | 4 | | | | | |
| i DOTS | 4 | | | | | |
| TOTAL | 86 | CATEGORIES 22 | | | | |

FIG. 5B
40
FROM FIG. 5A

| | | | | | | |
|---|---|---|---|---|---|---|
| HANDWRITING UNIQUE | | | | | | |
| MARGINS | 6 | BALANCED | WIDE ALL OVER | WIDE LEFT | WIDE RIGHT | LEFT NARROWING |
| SPACING BETWEEN LINES | 3 | REGULAR | SPACIOUS | CROWDED | | |
| PERSONAL PRONOUN I | 6 | | | | | |
| TOTAL | 15 | CATEGORIES 3 | | | | |
| SIGNATURE UNIQUE | | | | | | |
| EMBELLISHMENT | 5 | OVERSCORE | UNDERSCORE | ENCIRCLE | CROSSING OUT | PERIOD AT END |
| PLACEMENT ON PAGE | 6 | CONVENTIONAL RIGHT | FAR RIGHT | CENTER | LEFT | EXTREME LEFT |
| OVERALL CONGRUENCE | 4 | | | | | |
| GIVEN VS FAM NAME | 3 | | | | | |
| TOTAL | 18 | CATEGORIES 4 | | | | |
| GRAND TOTAL | 119 | CATEGORIES 29 | | | | |

FIG. 6

*Individual Insights...*™ 

Name: _____
Date: _____

☑ Writing: How the writer feels
☒ Signature: How the writer behaves

**Size - *Personal Presence***
- a) ○ ☐ likes being noticed, stands out in a crowd
- b) ○ ☐ adaptable, fits into a crowd
- c) ○ ☐ introspective, not seeking attention
- d) ○ ☐ private, stays out of limelight

**Slant - *Emotional Interactions***
- a) ○ ☐ impulsive, needs to relate to others
- b) ○ ☐ sociable, responsive, interested in others
- c) ○ ☐ practical, independent, head rules over heart
- d) ○ ☐ socially cautious, reserved, observant
- e) ○ ☐ self-involved, resistant
- f) ○ ☐ ambivalent, moods vary

**Simplicity - *Clarity of Thought and Action***
- a) ○ ☐ clear, efficient thinking
- b) ○ ☐ practical, uses common sense
- c) ○ ☐ may get caught up unnecessary details

**Originality - *Individuality/Uniqueness***
- a) ○ ☐ imaginative, creative, own style of expression
- b) ○ ☐ creative yet tends to blend in
- c) ○ ☐ conventional, conforming

**Connections - *Attitude Towards Others***
- a) ○ ☐ empathic, responsive
- b) ○ ☐ self protective, cautious, creative
- c) ○ ☐ probing, decisive, analytical
- d) ○ ☐ diplomatic, evasive

**Connectedness - *Relationship to Environment***
- a) ○ ☐ literal, logical
- b) ○ ☐ intuitive, flexible
- c) ○ ☐ factual, limits show of emotions
- d) ○ ☐ versatile personality, ingenuity

**Capitals - *Showmanship***
- a) ○ ☐ desires to be noticed
- b) ○ ☐ confident self presentation
- c) ○ ☐ unpretentious, underplays self

**Zone emphasis - *Energy Emphasis***
- a) ○ ☐ highly imaginative, reaches for ideas
- b) ○ ☐ strong concern for day to day issues
- c) ○ ☐ strong material and physical needs
- d) ○ ☐ balanced intellectually, emotionally, and physically

**Rhythm - *Control***
- a) ○ ☐ possesses spontaneity balanced self-control
- b) ○ ☐ regimented, over controlled, uses firm judgement
- c) ○ ☐ unpredictable in actions and reactions, emotionally unsettled

**Pressure - *Intensity***
- a) ○ ☐ bold and intense
- b) ○ ☐ healthy, sufficient energy
- c) ○ ☐ sensitive, goes with the flow

**Baseline - *Disposition***
- a) ○ ☐ determined, stays on track
- b) ○ ☐ regimented, fears losing control
- c) ○ ☐ optimistic, upbeat, positive attitude
- d) ○ ☐ tired or overwhelmed, pessimistic
- e) ○ ☐ feeling extremely overwhelmed, saddened
- f) ○ ☐ fighting pessimistic attitudes
- g) ○ ☐ has too much going on at one time
- h) ○ ☐ striving to stay optimistic
- i) ○ ☐ struggling with negative feelings
- j) ○ ☐ wavering, lacks definite direction

Notes:
_____
_____
_____
_____
_____
_____
_____ www.handwritinginsights.com

Basic © 1998 Hidden Creek Farm, Inc.

HANDWRITING ANALYSIS SYSTEM

Priority of Provisional Application Ser. No. 60/058,907, filed on Sep. 2, 1997 is hereby claimed.

BACKGROUND OF THE INVENTION

The present invention is related to a handwriting analysis system and, more particularly, to a handwriting analysis system based upon a pre-defined set of handwriting characteristics as described on a set of flash cards.

Handwriting analysis has been performed for centuries and there exist many textbooks and courses that can be used to develop handwriting analysis expertise. Many of these methods are long and laborious, involving extensive reading through one or more books, or taking a course to develop the necessary analysis skills. In each instance, there is a large body of data that must be remembered to perform even a rudimentary analysis. One prior art system uses a group of handwriting indicators arranged in alphabetical order. However, a given handwriting sample may contain none of these indicators and, in any case, the entire alphabetical set must be reviewed to perform the analysis.

SUMMARY OF THE INVENTION

The need remaining in the prior art is addressed by the present invention, which relates to a handwriting analysis system and, more particularly, to a handwriting analysis system based upon a pre-defined set of handwriting characteristics as described on a set of flash cards.

In accordance with the present invention, a basic set of handwriting characteristics has been distilled and provided on a set of flash cards used to embody the system. The flash cards comprise various subsets of cards, each subset associated with a particular handwriting "indicator" (an "indicator" is defined as an attribute of the writing, such as, for example, size, slant, fullness, pressure, etc.). Each card within a particular subset contains a particular handwriting sample illustrating different variations of that indicator. For example, the subset related to "size" may include four separate flash cards, each card illustrating one of the following handwriting "size" samples: "very small", "small", "medium", and "large. In performing a handwriting analysis in accordance with the present invention, a given handwriting sample is compared against each "size" flash card handwriting example, and the card that best matches the handwriting sample is selected. In accordance with the system of the present invention, each card includes a brief explanation of a personality trait associated with that card. For example, the personality trait "personal presence" is associated with the handwriting indicator "size". Therefore, each card in the "size" subset will include a brief description of the "personal presence" trait associated with that size of handwriting. In using the handwriting analysis system of the present invention, each separate handwriting indicator is reviewed and one card from each indicator subset is selected that best matches the handwriting sample. Thus, once the proper card is selected from each subset is selected, each selected card may then be reviewed to collect the personality trait information and therefore provide the handwriting analysis in association with the inventive system.

In one embodiment of the present invention, the set of handwriting indicators is associated with conventional, adult handwriting. Another embodiment utilizes a set of indicators associated with "signatures" (where one's signature may be different in a number of traits when compared with one's handwriting). Yet another embodiment may comprise a set of handwriting indicators associated with a child's printing.

In a preferred arrangement of the present invention, a handwriting sample is illustrated on a first side of an exemplary flash card and the associated personality trait is described on the reverse side of the flash card. Alternatively, the handwriting sample and personality trait may be depicted on the same side of the flash card.

In general, any desired set of handwriting indicators may be distilled into card form; each indicator including a subset of cards with a separate card in each subset illustrating the variations of that particular indicator. The personality trait for each indicator variation is included on the back surface of the card so that a selected set of cards from each subset may be used to provide the handwriting analysis in accordance with the present invention.

Other and further embodiments of the present invention will become apparent during the course of the following discussion and by reference to the accompanying drawings.

BRIEF DESCRIPTION OF THE DRAWINGS

Referring now to the drawings,

FIG. 1 illustrates an exemplary introductory card used to delineate a particular subset of handwriting analysis flash cards;

FIG. 2 is an exemplary handwriting analysis flash card associated with the "size" handwriting indicator, the card of FIG. 2 containing an example of "large" handwriting, FIG. 3 is a view of the rear of the card of FIG. 2, containing an explanation of the personality trait associated with "large" handwriting;

FIG. 4 is a separate handwriting analysis flash card associated with the "size" handwriting indicator, the card of FIG. 4 containing an example of "medium" handwriting;

FIG. 5 contains a table illustrating an exemplary number of different handwriting indicators and the variations associated with each indicator; and FIG. 6 is an exemplary handwriting analysis listing that may be used in association with the flash card system of the present invention.

DETAILED DESCRIPTION

In accordance with the present invention, a handwriting analysis may be performed by using a set of handwriting flash cards, the set defined as including a number of pre-defined subsets. Each flash card subset is associated with a particular handwriting indicator (e.g., "size", "slant", etc.) and each card within the subset contains one type of handwriting associated with that particular indicator. To facilitate the use of the set of flash cards, a set of introductory cards may be included to partition the deck into the various subsets. FIG. 1 illustrates an exemplary introductory card 10, where card 10 is related to the "size" of the handwriting sample. A title area 12 is used to designate the particular handwriting indicator associated with a subset of cards. As indicated in area 14 of card 10, the handwriting indicator "size" is associated with the trait "personal presence". Another introductory card (not shown) would be associated with a different handwriting indicator, for example "slant", a third introductory card with "baseline", and so on, with each subset of flash cards having its own introductory card.

FIG. 2 illustrates an exemplary "size" indicator card 16 and, in particular, illustrates the front side 18 of card 16. In accordance with the present invention, front side 18 of card 16 includes a handwriting sample 20 exemplifying the defined handwriting indicator 12; in this case, "large" handwriting as designated in area 22. Rear side 24 of card 16 is illustrated in FIG. 3 and contains a brief description of the personality trait of "personal presence" associated with "large" handwriting (i.e., likes being noticed, etc.). A separate card 30 from the subset associated with "size"/"personal presence" is illustrated in FIG. 4. Front side 32 of card 30 includes a sample 34 of "medium" handwriting. As with card 16 illustrated in FIGS. 2 and 3, the rear side of card 30 (not shown) includes a brief description of the "personal presence" trait associated with "medium" handwriting.

Once the proper card associated with the "size" of the handwriting sample has been selected, the next subset of cards is reviewed, as delineated by the next introductory card. There may be, for example, over a dozen different subsets of cards, each subset containing two or more cards and associated with a different handwriting indicator. As the handwriting sample is compared against a given subset associated with a particular handwriting trait, the "best match" is selected. This process continues until the handwriting sample has been compared against each subset in the set of flash cards. Therefore, upon finishing the selection process, a set of "selected" flash cards has been identified, one card for each handwriting indicator/personality trait.

In accordance with the present invention, therefore, a handwriting analysis can then be performed by reviewing the selected cards from each indicator and collecting the information regarding "personality traits" from each card..

FIG. 5 contains a table 40 include an exemplary set of handwriting indicators 42, the set including indicators such as "size", "slant", "capitals", "simplicity", etc. The number of variations in each subset is listed in column 44 of table 40. For example, the handwriting indicator "capitals" includes a subset of four different cards, with each card definition indicated in columns 46–54 of table 40. In particular, the four types of "capitals" included in an exemplary subset of flash cards associated with this handwriting indicator are "very large", "average", "smaller than average", "same as lower case". As discussed above, a handwriting analysis is performed by reviewing these four cards and selecting the one that best matches the handwriting sample being reviewed. The personality trait indicated on the selected card is then used as part of the complete analysis.

In one embodiment of the present invention, the cards may be joined at one end by a closed pin member, so that the deck does not become jumbled, or the cards become lost. The cards may be color coded, with a different color used for each handwriting indicator. In an alternative embodiment, the card may have both the handwriting sample and personality description on the same side of the card. Alternatively, tabs may be used to delineate each indicator. Different card lengths for each indicator may also be used. The variations on the deck arrangement are endless and all variations are considered to fall within the scope of the present invention.

FIG. 6 illustrates an exemplary report pad 60 that may be used to record each selected card. Report pad 60 is useful in keeping track of the various handwriting indicators reviewed and aids in developing the handwriting analysis as each indicator is reviewed.

The handwriting analysis system of the present invention may be also be used for signature analysis. A different set of handwriting indicators, as shown in table 40 of FIG. 5, may be used to provide signature analysis. In particular, the indicators may include items such as "embellishment" and "placement on page". In general, the variety and types of indicators included in any set of analysis flash cards can be modified to include particular traits and is considered to fall within the spirit and scope of the present invention.

What is claimed is:

1. A handwriting analysis system comprising a set of analysis cards, the cards comprising a plurality of subsets of cards, each subset associated with a separate, pre-defined handwriting indicator, each card within each subset associated with a different handwriting style of the pre-defined indicator and containing both an example of the handwriting style and a description of the personality trait associated with the handwriting style.

2. A handwriting analysis system as defined in claim 1 wherein each card includes a handwriting style sample on a first side and the associated description of the personality trait on the opposite side.

3. A handwriting analysis system as defined in claim 1 wherein the handwriting style and associated personality description are contained on the same side of the card.

4. A handwriting analysis system as defined in claim 1 wherein the pre-defined subsets are associated with public handwriting indicators.

5. A handwriting analysis system as defined in claim 1 wherein the pre-defined subsets are associated with private signature indicators.

6. A handwriting analysis system as defined in claim 1 wherein the set of analysis cards further comprises a plurality of introductory cards, a separate introductory card associated with each subset of cards and containing a brief description of the associated, pre-defined handwriting indicator and personality trait.

7. A method of performing handwriting analysis using a set of analysis cards, the cards comprising a plurality of subsets of cards, each subset associated with a separate, pre-defined handwriting indicator, each card within each subset associated with a different handwriting style of the pre-defined indicator and containing an example of the handwriting style and a description of the personality trait associated therewith, the method comprising the steps of:

a) obtaining a handwriting sample to be analyzed;

b) comparing the handwriting sample obtained in step a) to each handwriting style associated with a first pre-defined handwriting indicator of a first subset of said plurality of subsets of cards;

c) selecting a card from said first subset that best matches, in handwriting style, the handwriting sample being analyzed;

d) repeating steps b) and c) for each different subset of cards;

e) collecting the personality trait information from each card selected in step c); and f) combining the personality information collected in step e) to provide a handwriting analysis of the obtained handwriting sample.

* * * * *